(12) United States Patent
Okamoto

(10) Patent No.: US 7,690,463 B2
(45) Date of Patent: Apr. 6, 2010

(54) STRADDLE-TYPE VEHICLE

(75) Inventor: Yasuo Okamoto, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 188 days.

(21) Appl. No.: 11/961,056

(22) Filed: Dec. 20, 2007

(65) Prior Publication Data
US 2008/0156557 A1 Jul. 3, 2008

(30) Foreign Application Priority Data
Dec. 28, 2006 (JP) ............... 2006-356601

(51) Int. Cl.
B60K 11/08 (2006.01)
(52) U.S. Cl. .................................. 180/68.3
(58) Field of Classification Search ............... 180/68.3, 180/219
See application file for complete search history.

(56) References Cited

U.S. PATENT DOCUMENTS 4,712,637 A * 12/1987 Mogi et al. ................. 180/219
4,733,639 A * 3/1988 Kohyama et al. ......... 123/198 E
6,920,950 B2 * 7/2005 Sonoda ...................... 180/68.3

FOREIGN PATENT DOCUMENTS

JP 2006-062581 3/2006

* cited by examiner

Primary Examiner—Lesley Morris
Assistant Examiner—Levon Fiore
(74) Attorney, Agent, or Firm—Keating & Bennett, LLP

(57) ABSTRACT

A straddle-type vehicle that adequately and smoothly sucks air into an air cleaner arranged between a front wheel and a leg shield while inhibiting foreign matter from being drawn thereinto. An intake port of the air cleaner is opened rearwardly. The leg shield is formed with a recess that surrounds the air cleaner. The recess includes a round portion along a direction in which the intake 61a is opened.

7 Claims, 18 Drawing Sheets

STRADDLE-TYPE VEHICLE

RELATED APPLICATIONS

This application claims the benefit of priority under 35 USC 119 of Japanese patent application no. 2006-356601, filed on Dec. 28, 2006, which application is hereby incorporated by reference in its entirety.

BACKGROUND OF THE INVENTION

1. Field of the Invention

The present invention relates to a straddle-type vehicle including an air cleaner arranged between a front wheel and a leg shield.

2. Description of Related Art

In straddle-type vehicles such as scooter-type and underbone-type motorcycles, a body cowl is often arranged forwardly of and extends downwardly of a steering head pipe. The body cowl is typically assembled to a leg shield arranged forwardly of a rider's legs. In such a vehicle, an air cleaner may be arranged between a front wheel and the leg shield (see, for example, JP-A-2006-62581, page 4, FIG. 2).

However, because the air cleaner is arranged between the front wheel and leg shield, there is room for improvement in adequately and smoothly sucking outside air into the air cleaner. An intake port of the air cleaner may be arranged toward the front of the vehicle and an air gap between a front fender and the leg shield may be enlarged in order to more adequately and smoothly suck air into the air cleaner. However, there is a problem in that foreign matter such as dust and water flung up by the front wheel are liable to be sucked into the air cleaner.

SUMMARY OF THE INVENTION

The present invention provides a straddle-type vehicle in which outside air is adequately and smoothly sucked into an air cleaner arranged between a front wheel and a leg shield while foreign matter is inhibited from being drawn thereinto.

A straddle-type vehicle according to the invention comprises a front wheel and a leg shield arranged rearwardly of the front wheel. An air cleaner is arranged between the front wheel and the leg shield and is formed with an intake port through which outside air is sucked. The intake port is opened rearwardly of the straddle-type vehicle. The leg shield is formed with a recess that surrounds the air cleaner. The recess includes a portion inclined along a direction in which the intake port is opened.

With such a straddle-type vehicle, the leg shield is formed with a recess that surrounds the air cleaner, and the recess includes a portion inclined along the direction in which the intake port is opened. Therefore, outside air around the leg shield is guided to the intake port by the recess.

Thus, outside air is adequately and smoothly sucked into the air cleaner. Also, since the intake port is opened rearwardly, foreign matter such as dust and water flung up by the front wheel is inhibited from being drawn into the air cleaner.

In one embodiment, the intake port is opened downwardly and rearwardly of the straddle-type vehicle.

In another embodiment, a rear wall portion is contiguous to a lower end of the inclined portion.

In another embodiment, a part of the air cleaner is arranged forwardly of the inclined portion.

In a further embodiment, a steering head pipe is arranged above the front wheel. A body cowl is arranged forwardly of the steering head pipe and extends downwardly of the steering head pipe. An undercover is connected to a lower end of the leg shield. The leg shield is arranged rearwardly of the body cowl, and the body cowl is mounted to and dismounted from the leg shield, to which the undercover is connected.

In a further embodiment, a rear cover is provided rearwardly of the leg shield to cover a predetermined region of the straddle-type vehicle. An engagement convex portion formed at a front end of the rear cover engages with the leg shield, and a receiving portion formed in the leg shield receives the engagement convex portion.

In a still further embodiment, an enlarged width portion of the leg shield spreads outward from inward in a vehicle width direction, and a front end of the rear cover abuts against the enlarged width portion.

According to the invention, a straddle-type vehicle is provided that adequately and smoothly sucks air into an air cleaner arranged between a front wheel and a leg shield while inhibiting foreign matters from being drawn thereinto.

Other features and advantages of the invention will be apparent from the following detailed description, taken in conjunction with the accompanying drawings which illustrate, by way of example, various features of embodiments of the invention.

DETAILED DESCRIPTION OF THE INVENTION

Figure 1:
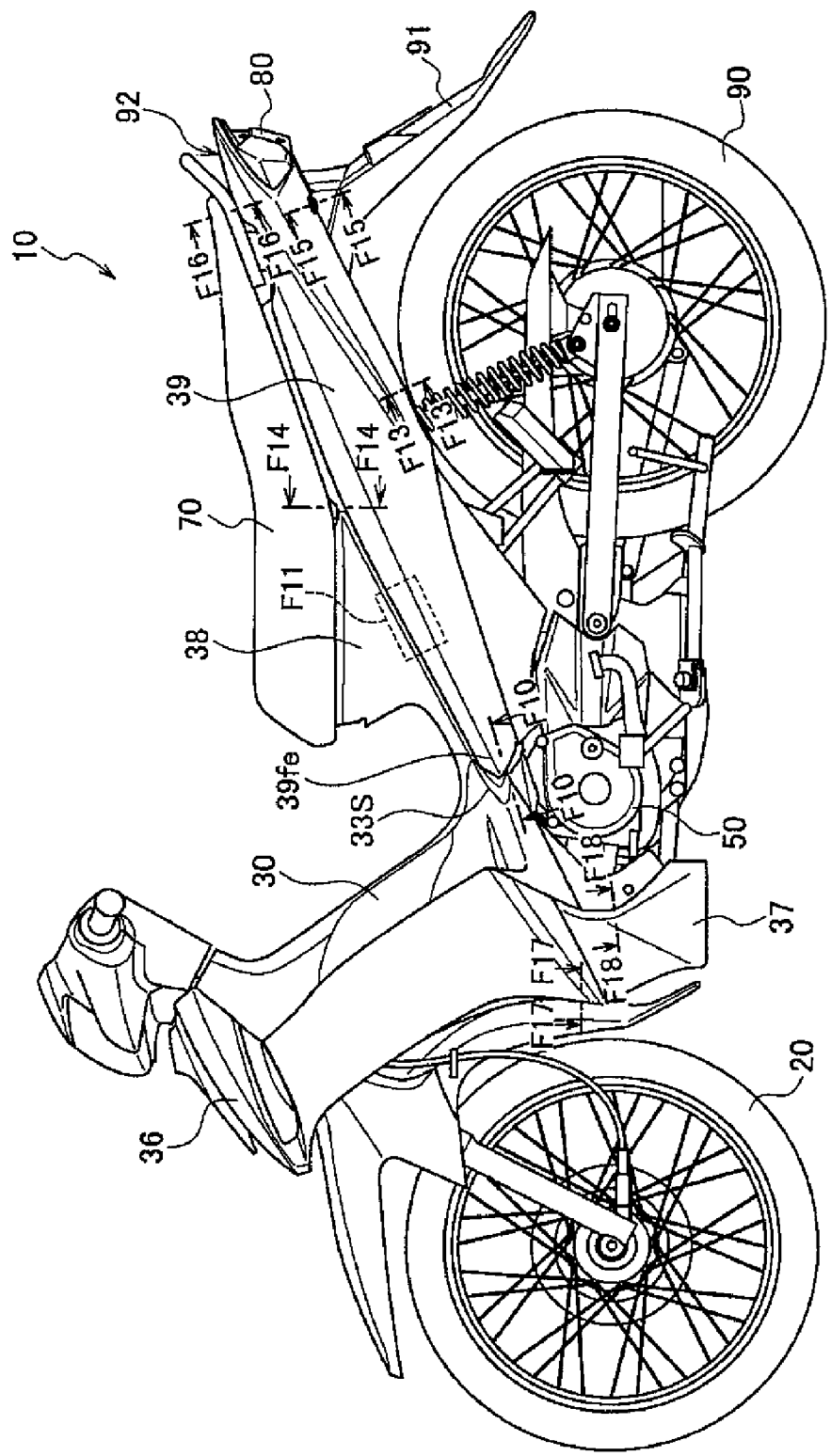
FIG. 1 is a left side view of a motorcycle according to an embodiment of the invention.

An embodiment of a straddle-type vehicle according to the invention is now described with reference to the drawings. The same or similar portions or parts in the drawings are denoted by the same or similar reference numerals. The drawings are schematic and ratios of respective dimensions are different from actual ones. Specific dimensions and the like should be determined from the following description. Dimensional relationships and ratios may vary from drawing to drawing.

(Construction of Straddle-Type Vehicle)

Figure 2:
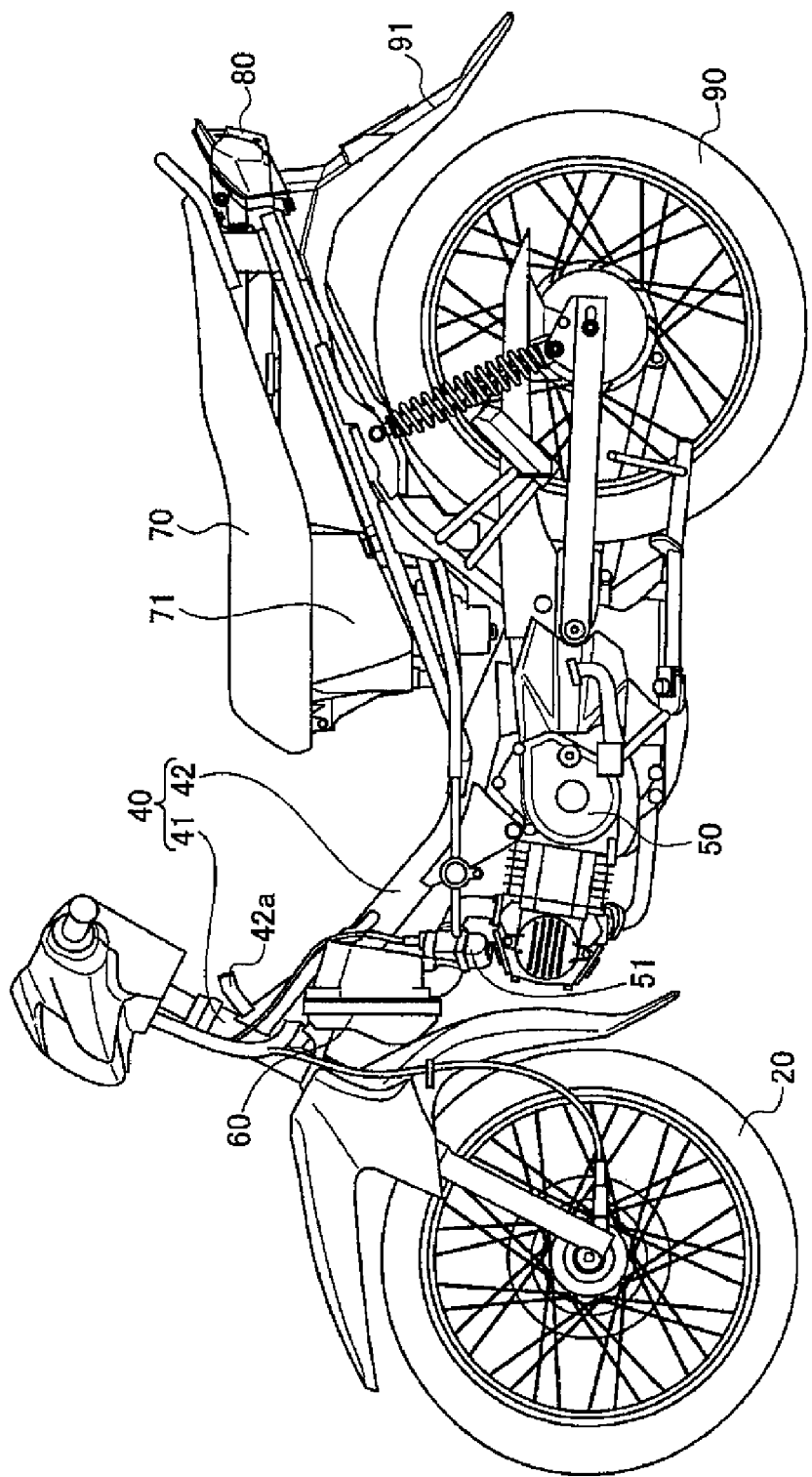
FIG. 2 is a left side view of the motorcycle of FIG. 1 with a body cover removed.

FIG. 1 is a left side view of a motorcycle 10 that is a straddle-type vehicle according to an embodiment of the invention. FIG. 2 is a left side view of motorcycle 10 with a body cover removed. Motorcycle 10 is a so-called underbone type motorcycle, in which a body frame 40 is arranged in a lower region as compared to conventional straddle-type motorcycles.

Motorcycle 10 includes a front wheel 20 and a rear wheel 90. A driving force generated by an engine 50 drives rear wheel 90. Body frame 40 includes a steering head pipe 41 arranged above front wheel 20 and a down tube 42 extending from steering head pipe 41.

Motorcycle 10 is covered by a plurality of body covers including a leg shield 30, a body cowl 36, an undercover 37, a seat lower cover 38 and a side cover 39. Leg shield 30 is arranged forwardly of legs of a rider seated on a seat 70. Body cowl 36 is arranged forwardly of steering head pipe 41 and extends downward. Undercover 37 is arranged below and is mounted to body cowl 36 and leg shield 30. Seat lower cover 38 is arranged below seat 70 and is connected to leg shield 30.

Side cover 39 covers a side (predetermined region) of motorcycle 10 rearwardly of leg shield 30. FIG. 1 shows only the left side cover 39; a similar cover is disposed on the right side. According to the embodiment, side cover 39 constitutes a rear cover that extends to a tail lamp unit 80 from a lower end of leg shield 30. An upper cover 92 is arranged above and covers tail lamp unit 80. A rear fender 91 arranged below tail lamp unit 80 inhibits rainwater flung up by rear wheel 90 from being scattered.

A carburetor 51 that regulates an air-fuel mixture supplied to engine 50 and an air cleaner 60 that purifies air supplied to carburetor 51 are arranged between front wheel 20 and leg shield 30 and connected to engine 50. An article storage box 71 is provided below seat 70.

(Construction of Leg Shield)

Figure 3:
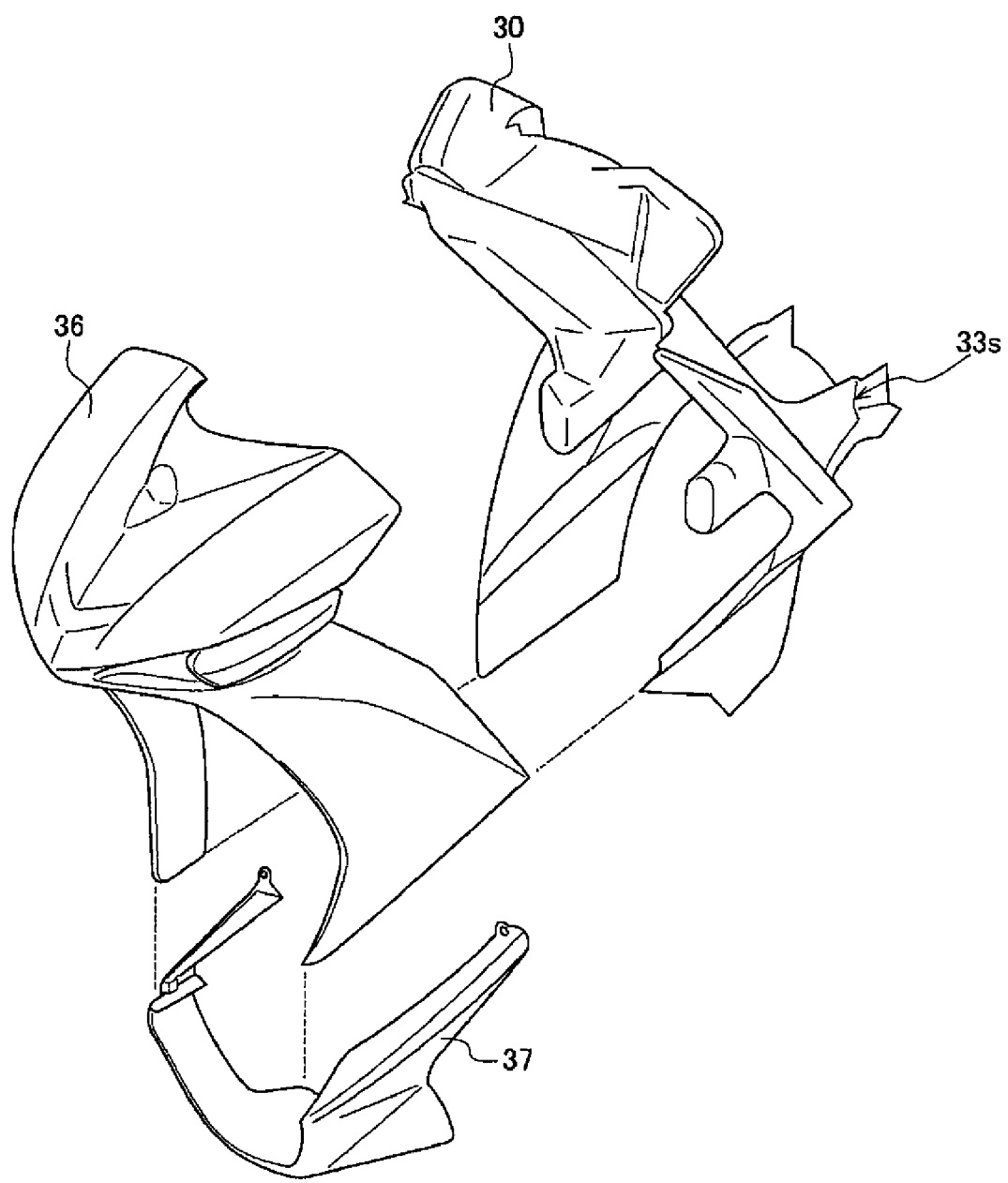
FIG. 3 is an exploded, perspective view of a leg shield, a body cowl and an undercover of the motorcycle of FIG. 1.
Figure 4:
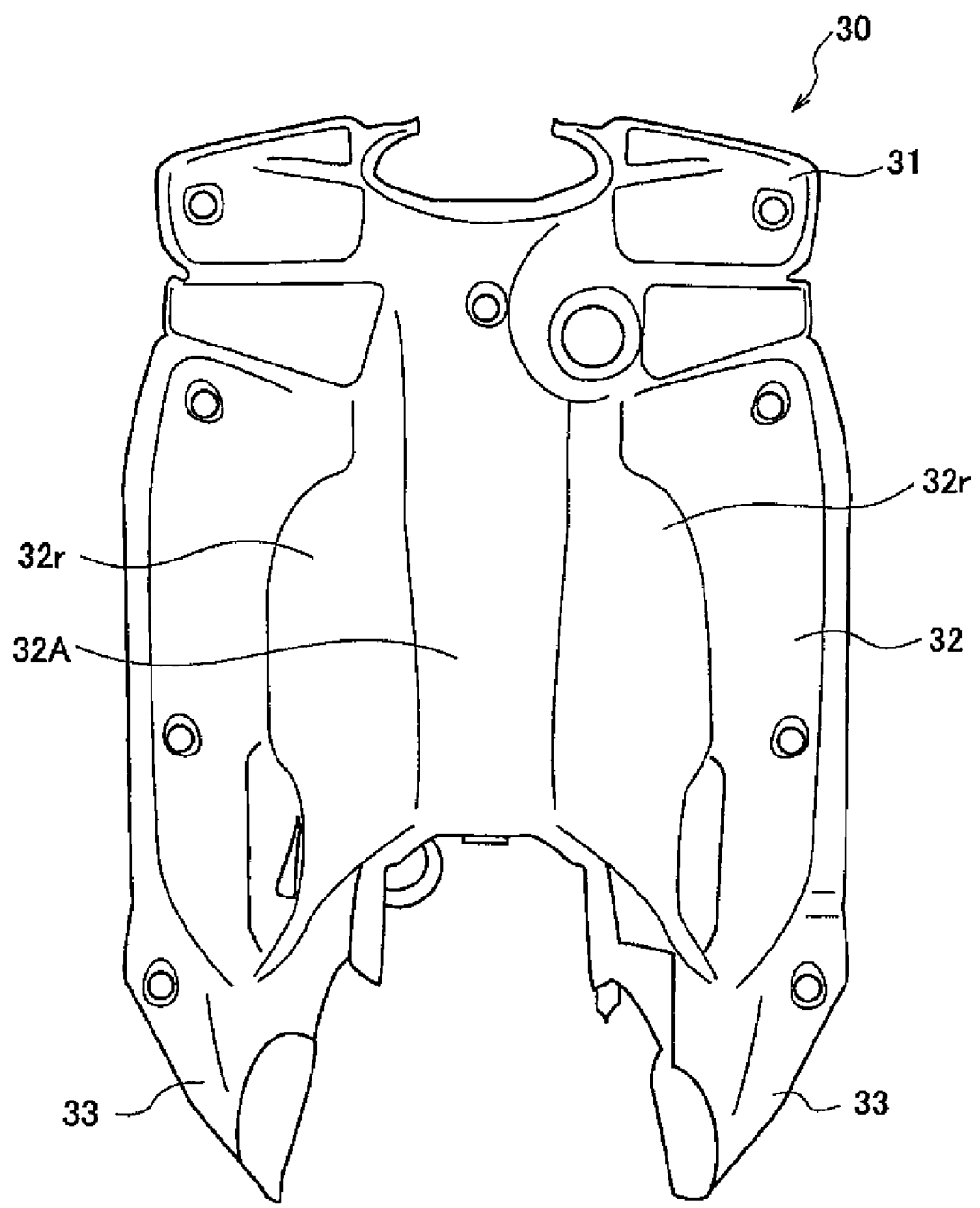
FIG. 4 is a rear view of the leg shield.
Figure 5:
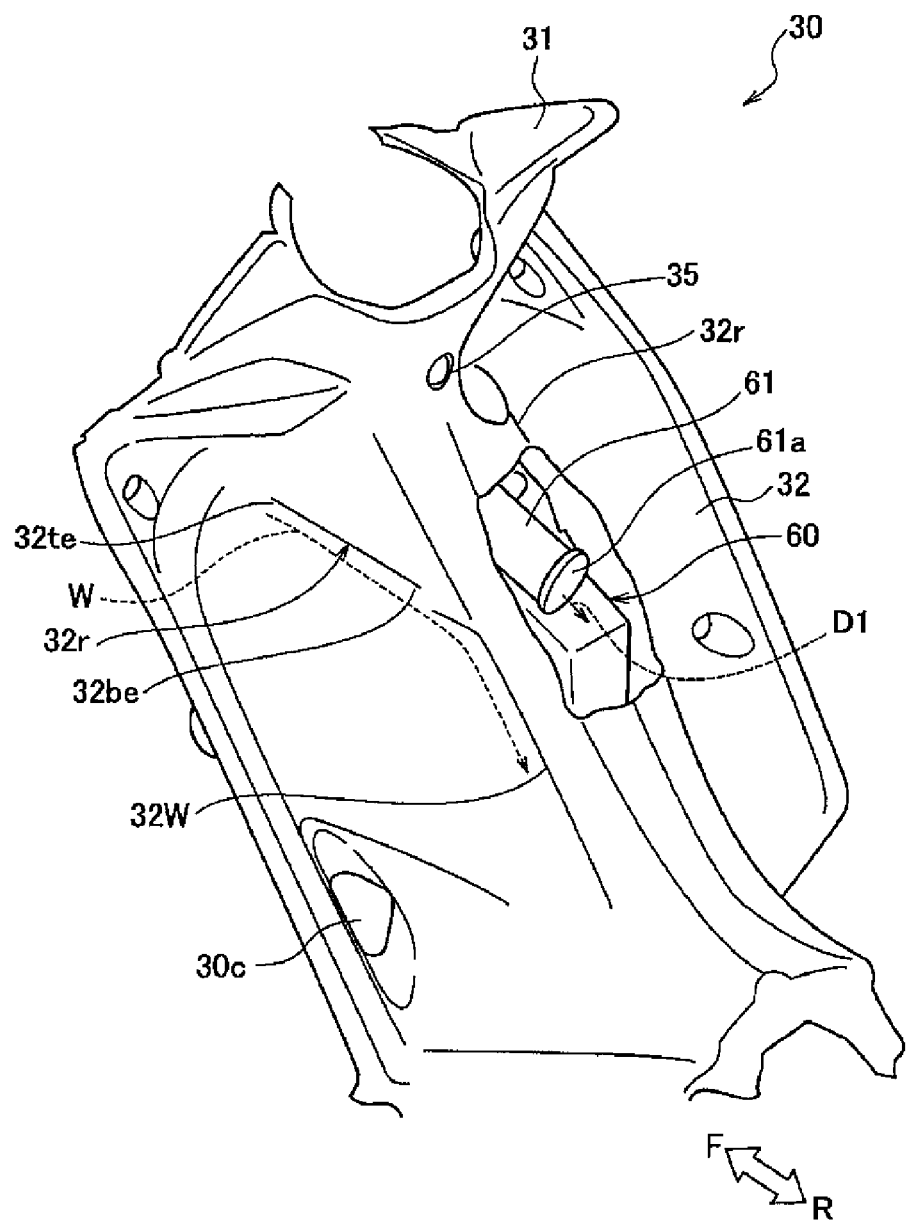
FIG. 5 is a rear, perspective view of the leg shield.
Figure 6:
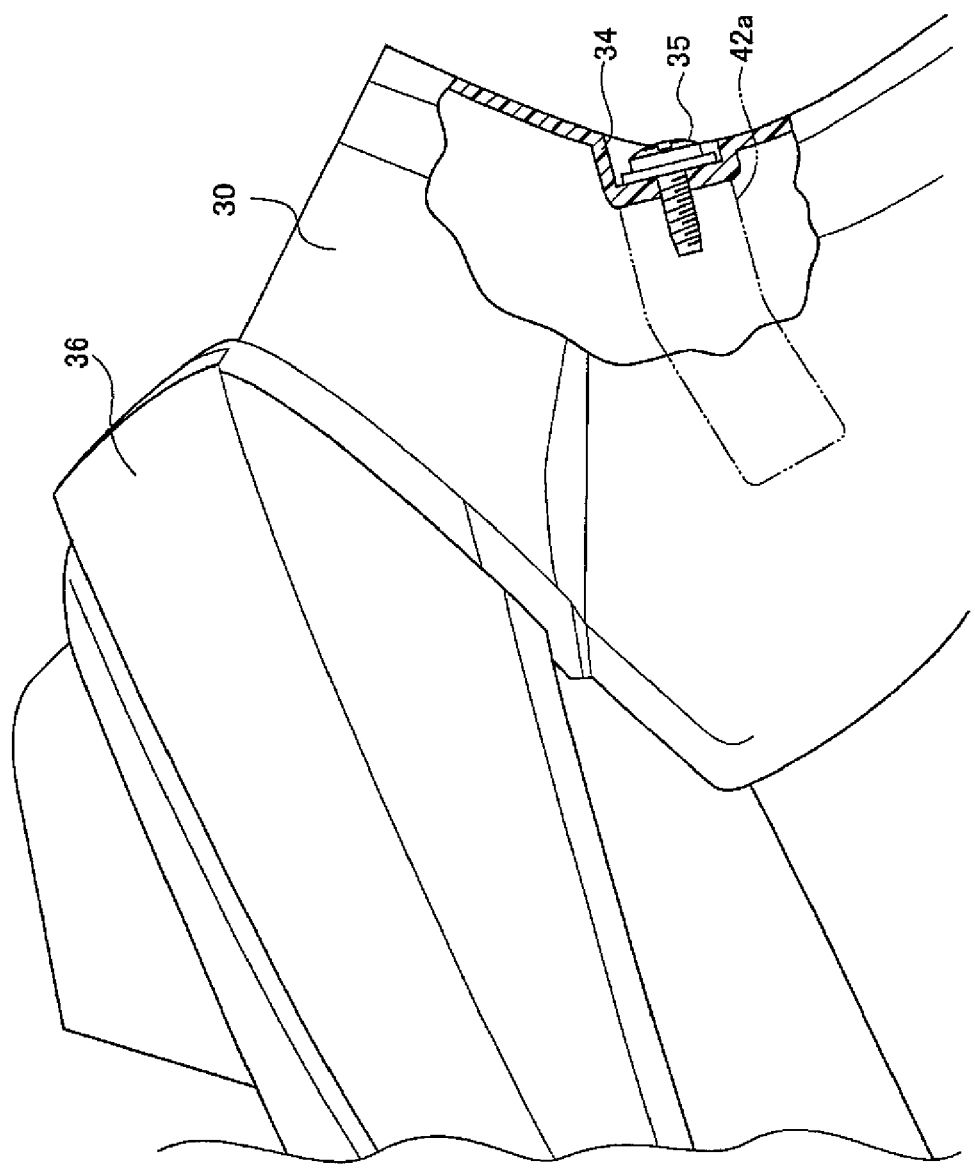
FIG. 6 is a view of a mount portion on which the leg shield and a body frame are mounted together.
Figure 7:
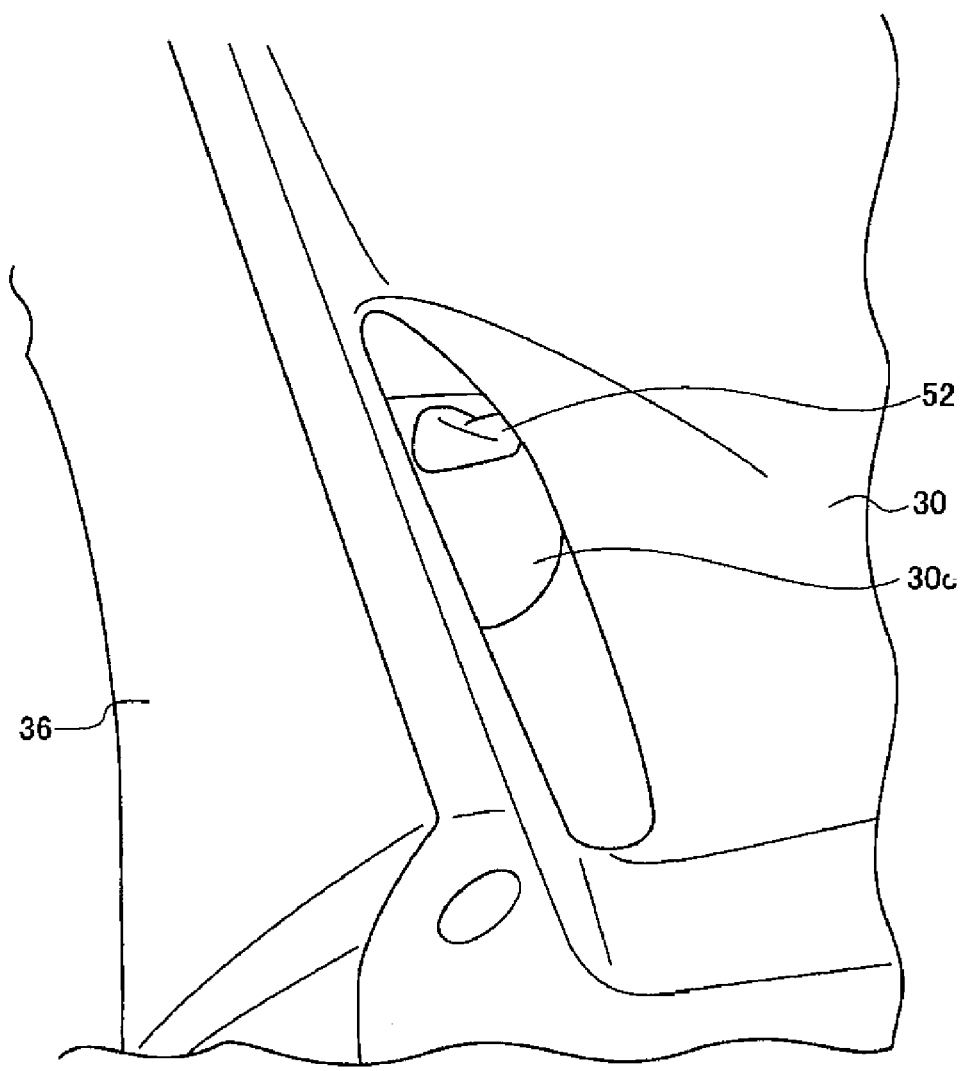
FIG. 7 is a partially enlarged, perspective view of a left, lower end of the leg shield.

The construction of leg shield 30 is described with reference to FIGS. 3-7. FIG. 3 is an exploded, perspective view of leg shield 30, body cowl 36 and undercover 37. FIG. 4 is a rear view of leg shield 30. FIG. 5 is a rear, perspective view of leg shield 30 with a portion of the leg shield cut away to show the air cleaner 60. FIG. 6 shows a mount portion at which leg shield 30 and down tube 42 are mounted together. FIG. 7 is a partially enlarged, perspective view of a left, lower end of leg shield 30.

As shown in FIG. 3, leg shield 30 is assembled to body cowl 36 and undercover 37 and is arranged rearwardly of body cowl 36. Body cowl 36 is mounted to and dismounted from leg shield 30, to which undercover 37 is connected. That is, it is possible to remove only body cowl 36 in a state, in which leg shield 30, body cowl 36 and undercover 37 are mounted to body frame 40. The connection of leg shield 30, body cowl 36 and undercover 37 will be described later.

As shown in FIGS. 4 and 5, leg shield 30 comprises a head portion 31, a body portion 32 and a leg portion 33. Head portion 31 surrounds steering head pipe 41 and extends in a vehicle width direction. Body portion 32 is contiguous to head portion 31 and is formed along down tube 42. Leg portion 33 is contiguous to body portion 32. Leg portion 33 forms a lower end of leg shield 30 and connects to undercover 37. A concave-shaped recess 32A that surrounds air cleaner 60 is formed on a front surface of leg shield 30. Recess 32A guides outside air to air cleaner 60.

As shown in FIG. 5, air cleaner 60 includes an intake duct 61 formed with an intake port 61a, through which outside air is sucked. Intake port 61a opens downward and rearwardly of motorcycle 10. That is, intake duct 61 provided above air cleaner 60 is inclined downwardly and rearwardly of motorcycle 10. Intake port 61a is formed at a rear end of intake duct 61.

Recess 32A is shaped to be substantially round so as not to cause turbulence of flow of outside air drawn into air cleaner 60. Specifically, a round portion 32r is formed above recess 32A. Round portion 32r is inclined along a direction D1 in which intake port 61a is opened, as viewed in side view of motorcycle 10. According to the embodiment, round portion 32r constitutes an inclined portion. More specifically, round portion 32r is formed in the vicinity of intake port 61a to bend downwardly and rearwardly of motorcycle 10. An upper end 32te of round portion 32r is inclined forwardly of a lower end 32be of recess 32A. A part of air cleaner 60 is arranged forwardly of round portion 32r.

Recess 32A includes a rear wall portion 32w contiguous to the lower end of recess 32A. Rear wall portion 32w is inclined to a less extent than recess 32A and extends along a back surface of leg shield 30.

A service hole 30c is formed at a left, lower end of leg shield 30. A choke lever 52 (FIG. 7) is arranged in service hole 30c and is connected to carburetor 51.

As shown in FIGS. 5 and 6, leg shield 30 has a mount hole 34. Mount hole 34 overlaps a mount stay 42a formed on down tube 42. A screw 35 is inserted through mount hole 34 to mount leg shield 30 to mount stay 42a. As described above, it is possible to remove only body cowl 36 in a state in which leg shield 30 is mounted to body frame 40, specifically, down tube 42.

(Construction of Rear Cover)

Figure 8:
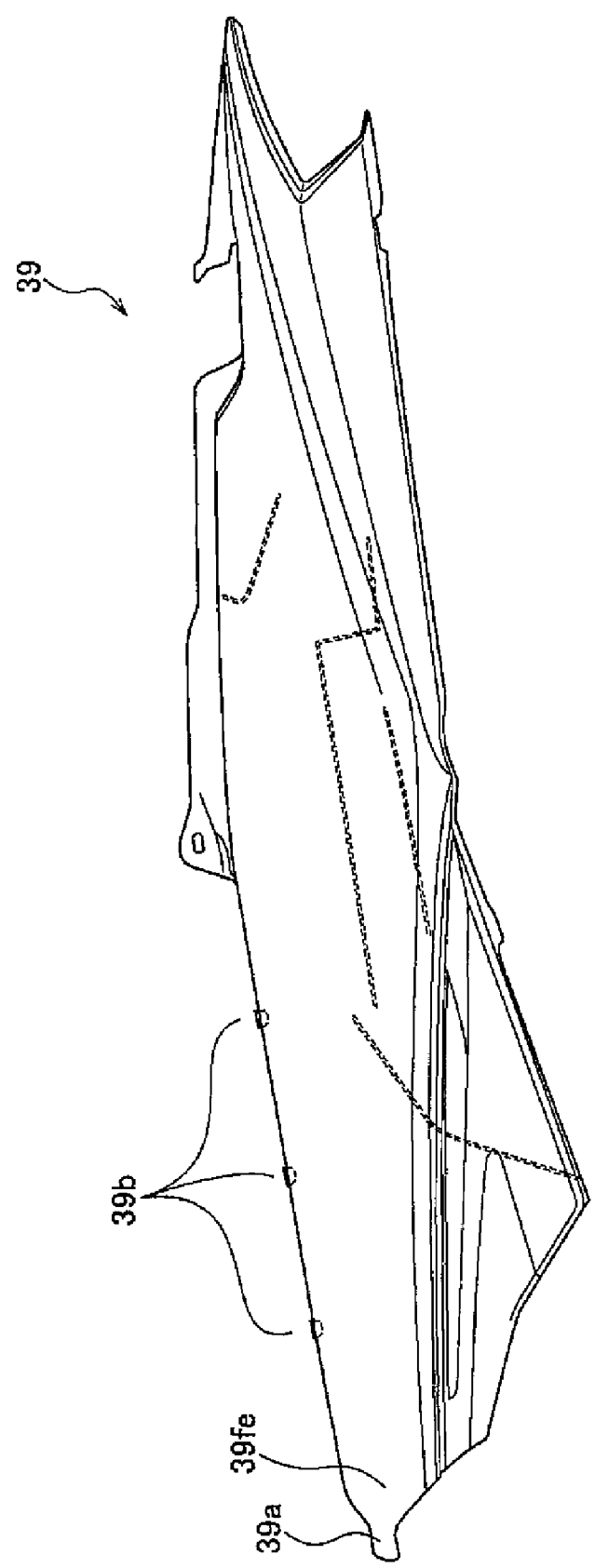
FIG. 8 is a side view of a side cover according to an embodiment of the invention.
Figure 9:
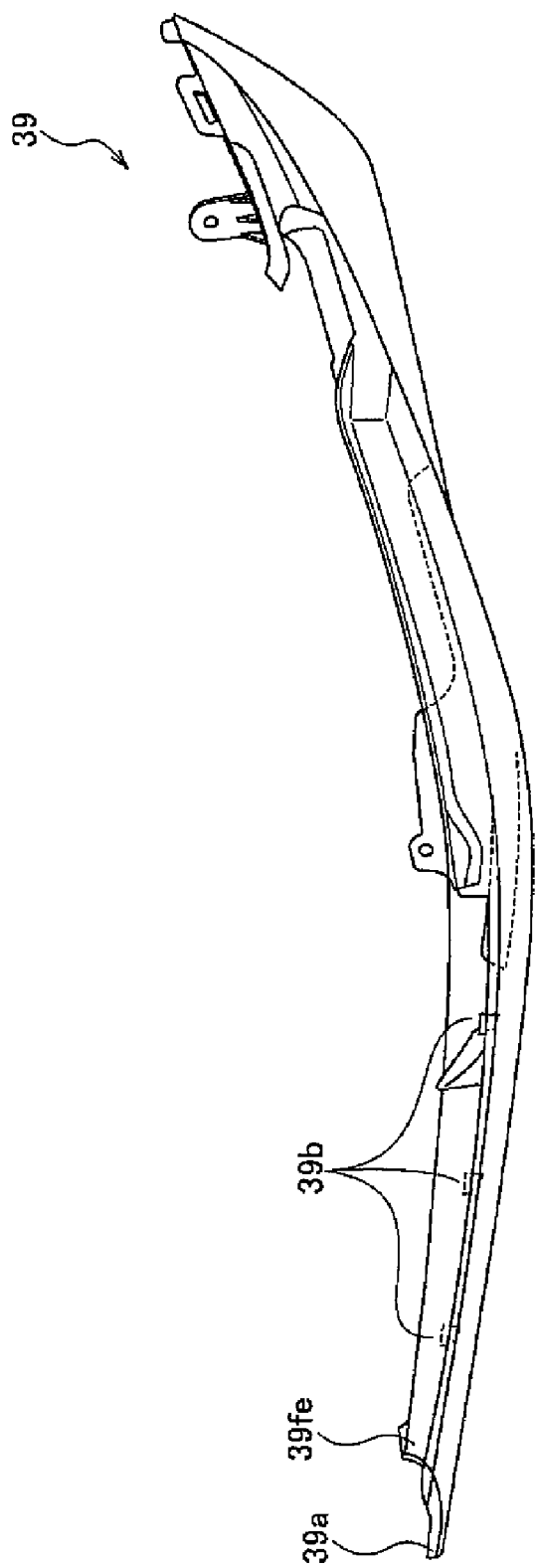
FIG. 9 is a plan view of the side cover.

The construction of side cover 39, which constitutes a rear cover in the embodiment, is described with reference to FIGS. 8 and 9. FIG. 8 is a side view of side cover 39. FIG. 9 is a plan view of side cover 39.

As shown in FIGS. 8 and 9, an engagement convex portion 39a that engages with leg shield 30 is provided at a front end 39fe of side cover 39. Engagement convex portion 39a is inserted into a receiving portion 33a (FIG. 10) formed on leg shield 30. A latch pawl 39b for engagement with seat lower cover 38 is provided on an inner side of side cover 39.

(State in which a Body Cover is Mounted)

A state in which a body cover that covers motorcycle 10 is mounted is not described.

(1) Leg Shield 30 and Side Cover 39

Figure 10:
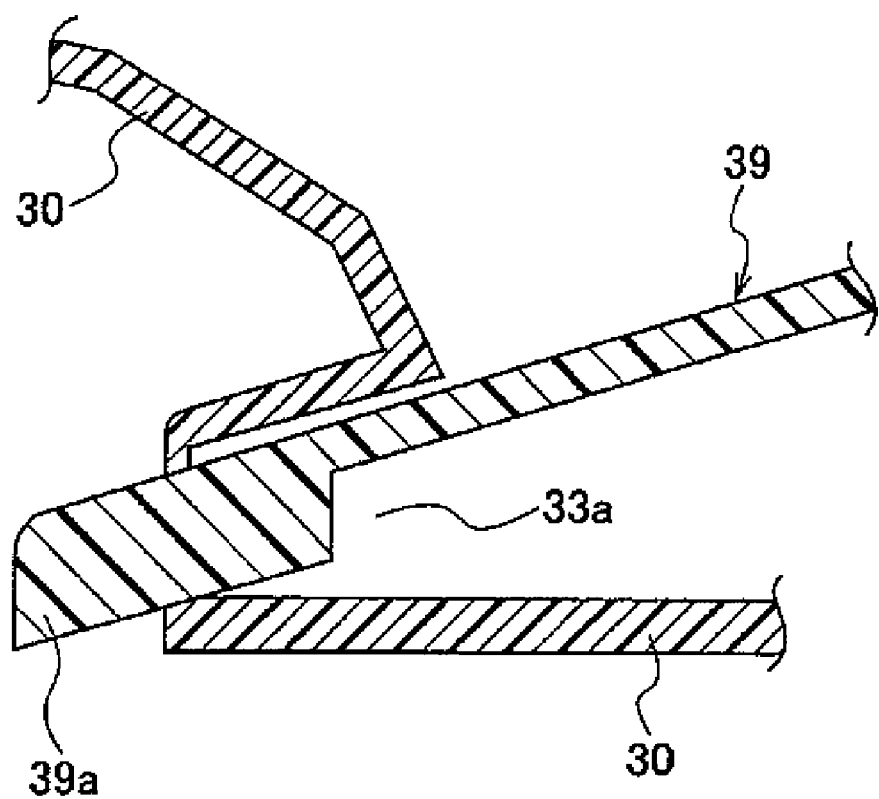
FIG. 10 is a cross sectional view taken along line F10-F10 of FIG. 1.

FIG. 10 is a cross sectional view taken along line F10-F10 of FIG. 1. As shown in FIG. 10, receiving portion 33a of leg shield 30 receives engagement convex portion 39a.

An enlarged width portion 33s of leg shield 30 (FIG. 3) spreads outward from inward in the vehicle width direction. Front end 39fe of side cover 39 abuts against enlarged width portion 33s.

Leg shield 30 is mounted with mount stay 42a that is formed on down tube 42 as a front point of reference. Side cover 39 is mounted with a mount portion (FIG. 15 that is formed on tail lamp unit 80 as a rear point of reference Tolerances of leg shield 30 and side cover 39 are absorbed by engagement convex portion 39a and receiving portion 33a.

(2) Seat Lower Cover 38 and Side Cover 39

Figure 11:
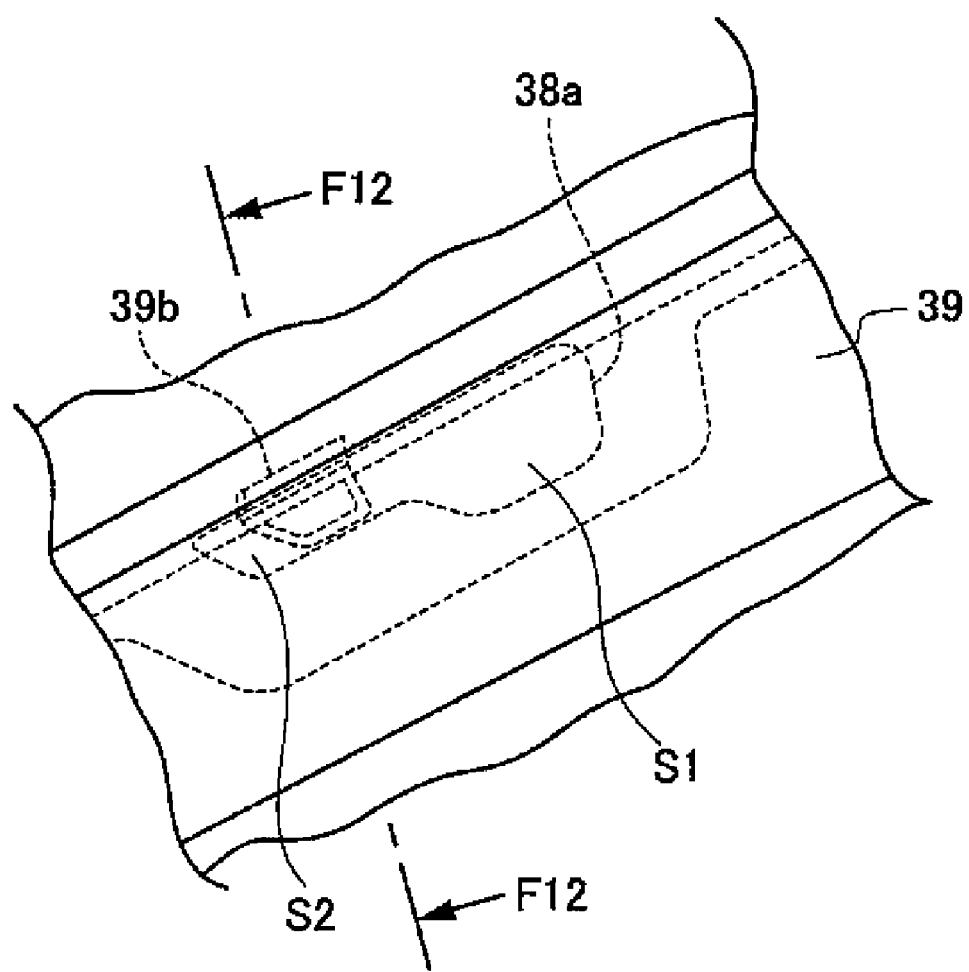
FIG. 11 is an enlarged view of region F11 of FIG. 1.
Figure 12:
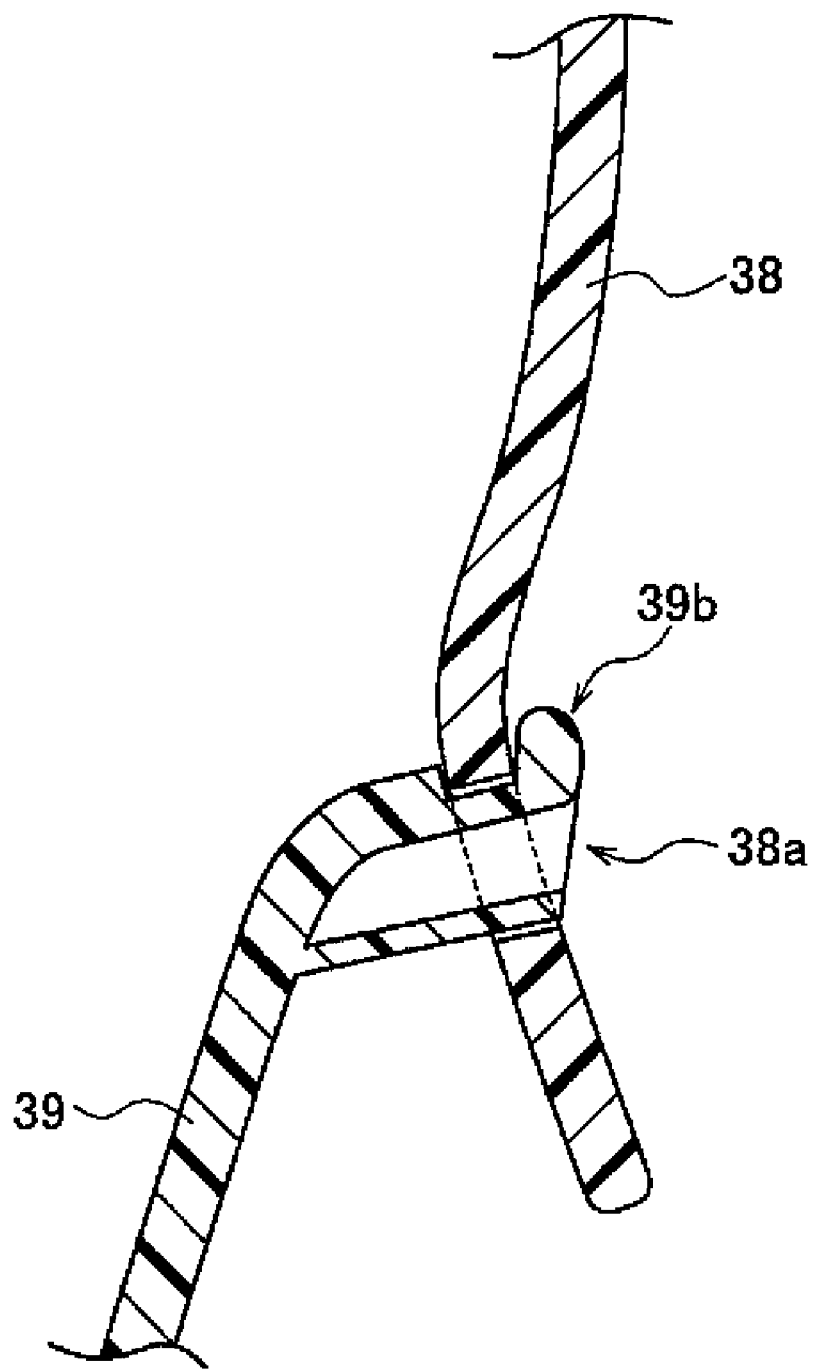
FIG. 12 is a cross sectional view taken along line F12-F12 of FIG. 11.

FIG. 11 is an enlarged view of region F11 of FIG. 12. FIG. 12 is a cross sectional view taken along line F12-F12 of FIG. 11. As shown in FIGS. 11 and 12, side cover 39 includes latch pawl 39b that is latched in a latch hole 38a formed on seat lower cover 38. Latch hole 38a comprises regions S1 and S2. Region S1 is larger than region S2. Region S2 is contiguous to and forward of region S1.

Latch pawl 39b is first inserted into region S1 of latch hole 38a. Side cover 39 is then slid forwardly so that latch pawl 39b is latched in region S2. Multiple latch holes 38a and latch pawls 39b (three are shown) may be provided.

(3) Side Cover 39 and Rear Fender 91

Figure 13:
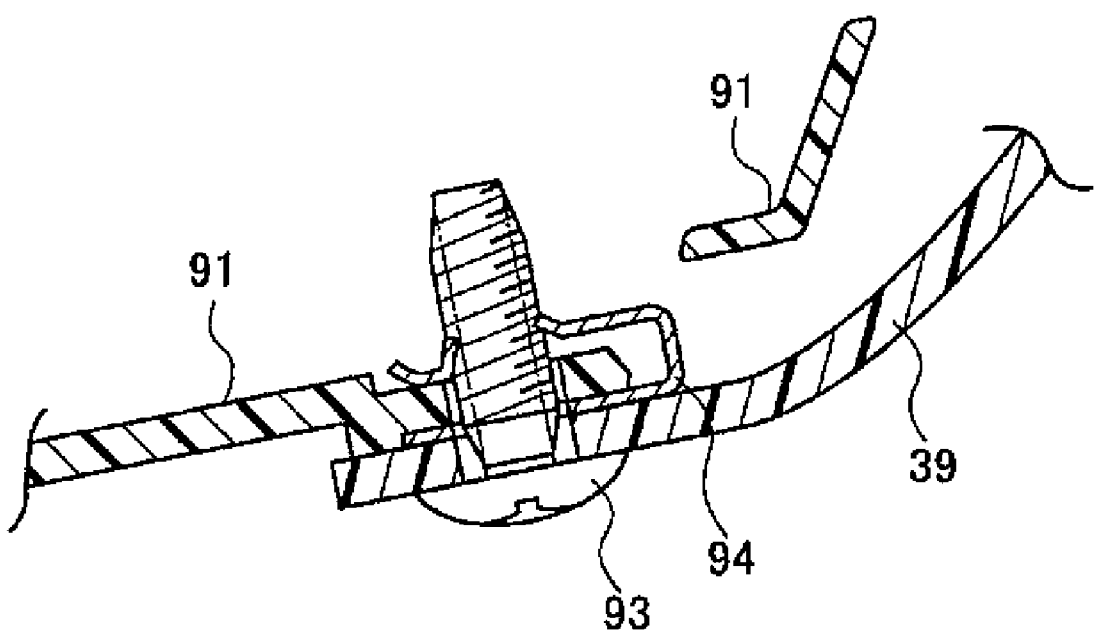
FIG. 13 is a cross sectional view taken along line F13-F13 of FIG. 1.

FIG. 13 is a cross sectional view taken along line F13-F13 of FIG. 1. As shown in FIG. 13, side cover 39 and rear fender 91 are connected to each other by a screw 93 and a spring nut 94.

(4) Seat Lower Cover 38, Side Cover 39, and Article Storage Box 71

Figure 14:
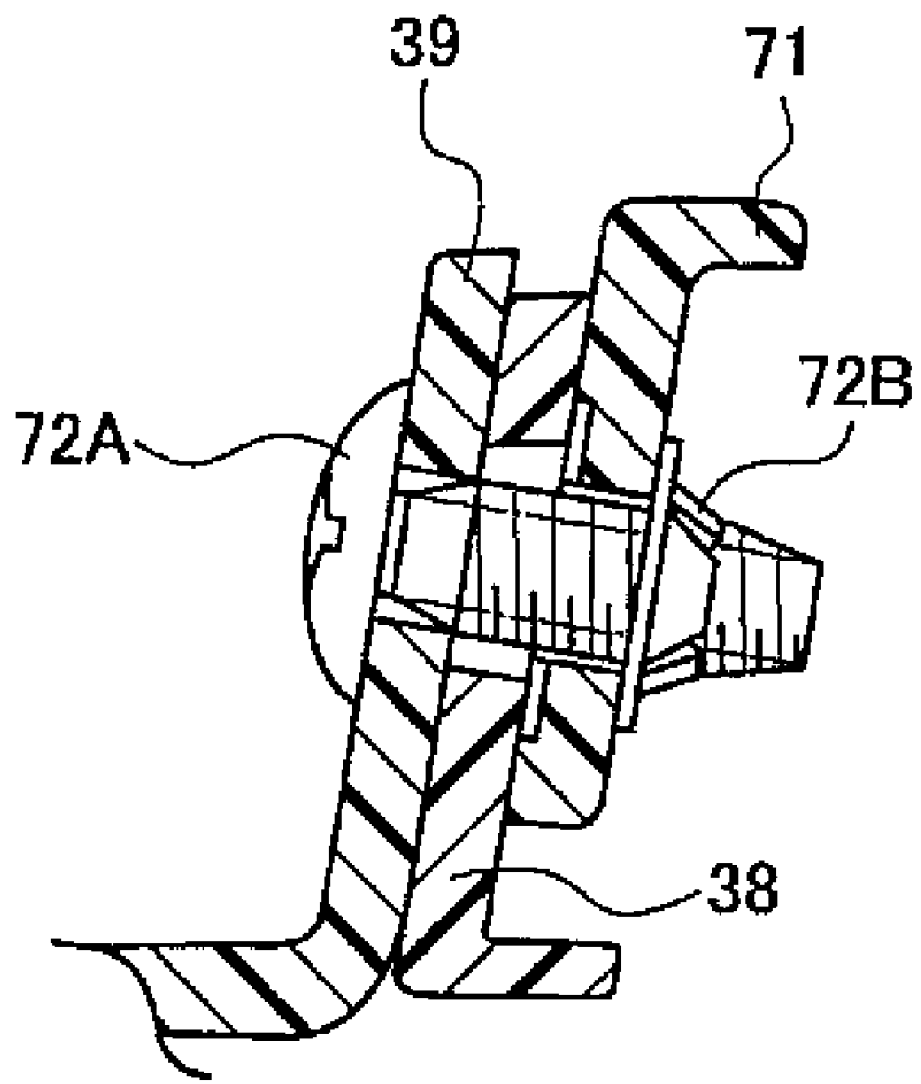
FIG. 14 is a cross sectional view taken along line F14-F14 of FIG. 1.

FIG. 14 is a cross sectional view taken along line F14-F14 of FIG. 1. As shown in FIG. 14, seat lower cover 38, side cover 39 and article storage box 71 are connected together by a screw 72A and a spring nut 72B.

(5) Side Cover 39 and Tail Lamp Unit 80

Figure 15:
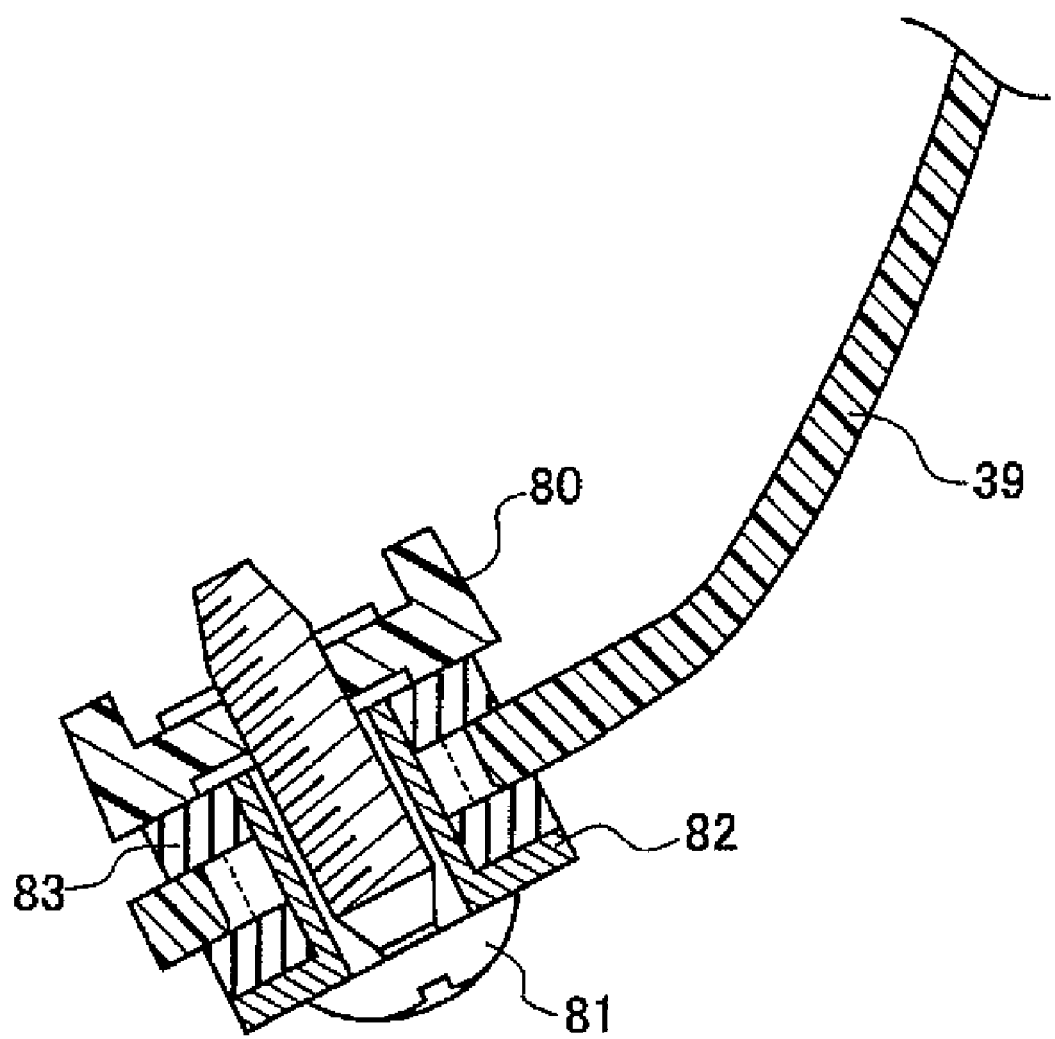
FIG. 15 is a cross sectional view taken along line F15-F15 of FIG. 1.

FIG. 15 is a cross sectional view taken along line F15-F15 of FIG. 1. As shown in FIG. 15, side cover 39 and tail lamp unit 80 are connected to tail lamp unit 80 by a screw 81. Specifically, a grommet 83 is fitted into a mount hole formed on side cover 39, and screw 81 is inserted into collar 82 to be connected to tail lamp unit 80.

(6) Side Cover 39 and Upper Cover 92

Figure 16:
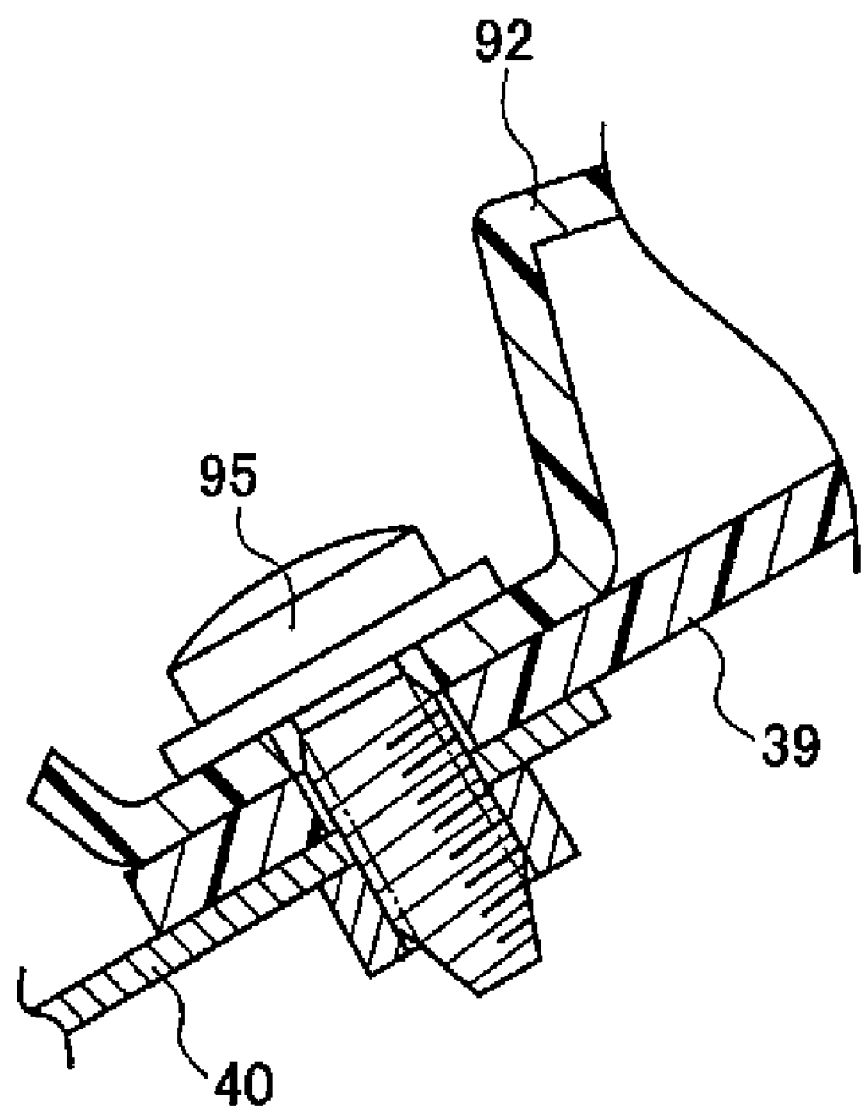
FIG. 16 is a cross sectional view taken along line F16-F16 of FIG. 1.

FIG. 16 is a cross sectional view taken along line F16-F16 of FIG. 1. As shown in FIG. 16, side cover 39 and upper cover 92 are connected to body frame 40 by a screw 95 with a washer.

(7) Body Cowl 36 and Undercover 37

Figure 17:
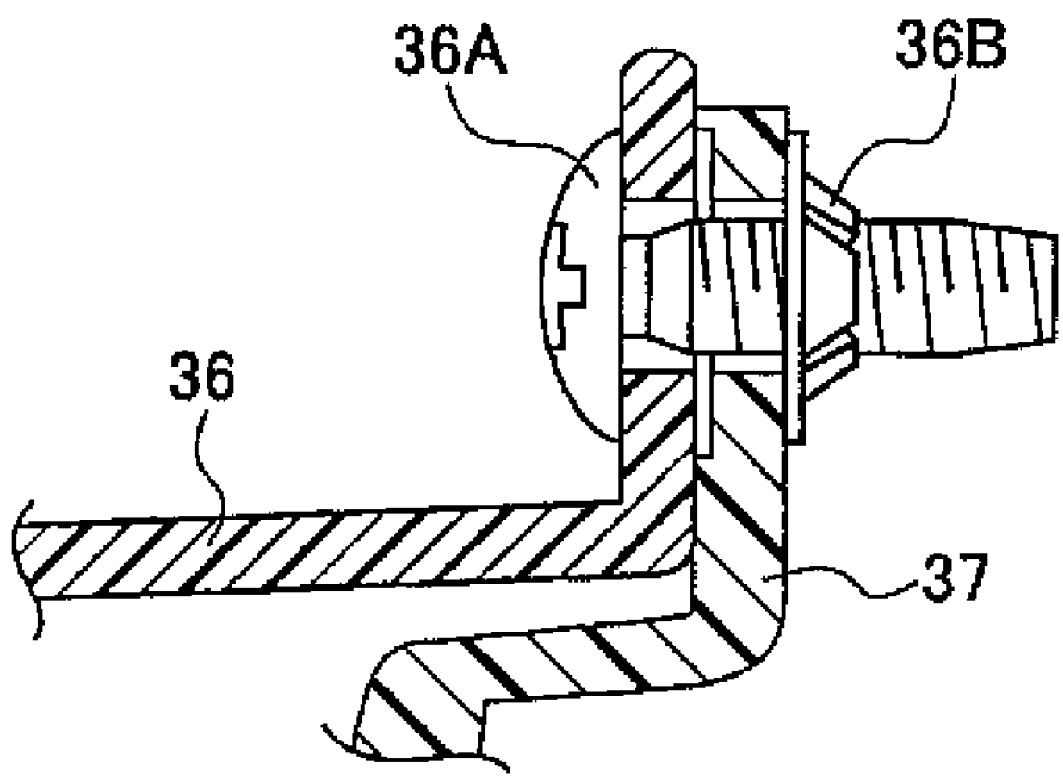
FIG. 17 is a cross sectional view taken along line F17-F17 of FIG. 1.

FIG. 17 is a cross sectional view taken along line F17-F17 of FIG. 1. As shown in FIG. 17, body cowl 36 and undercover 37 are connected together by a screw 36A and a spring nut 36B. Body cowl 36 and undercover 37 are also connected together in other locations.

(8) Leg Shield 30 and Undercover 37

Figure 18:
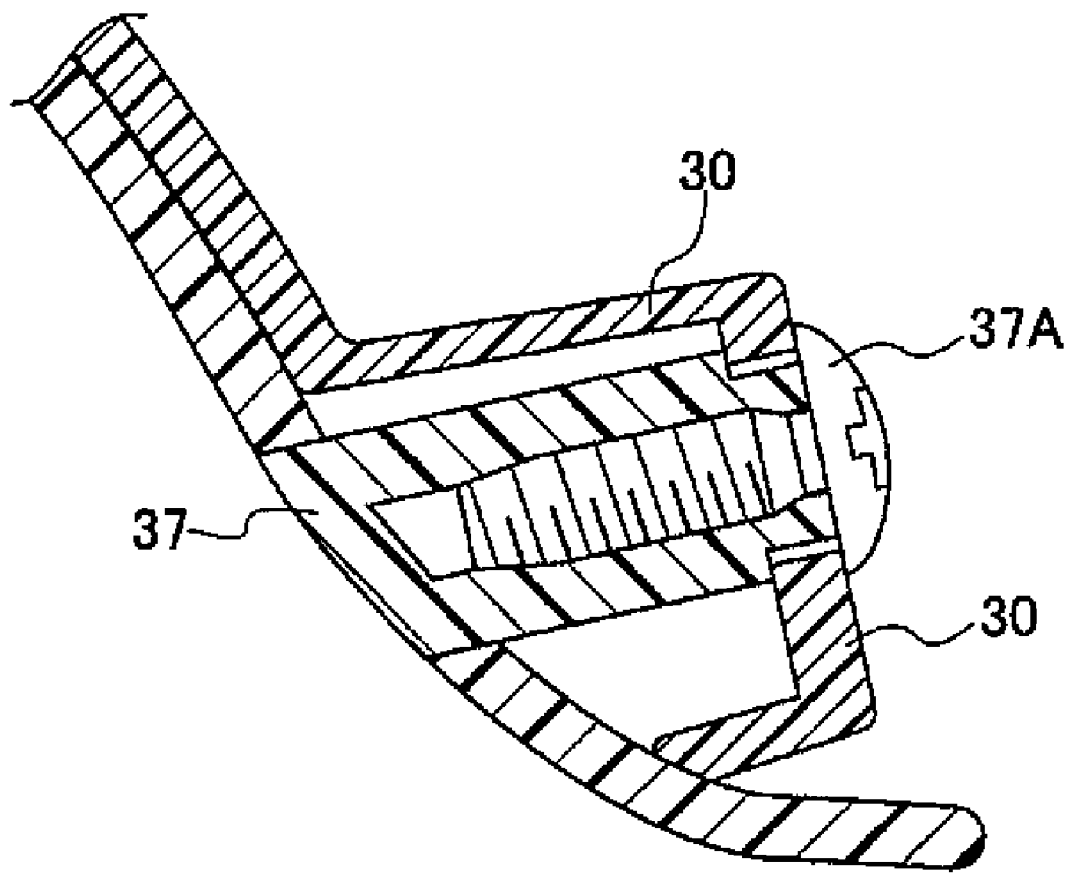
FIG. 18 is a cross sectional view taken along line F18-F18 of FIG. 1.

FIG. 18 is a cross sectional view taken along line F18-F18 of FIG. 1. As shown in FIG. 18, leg shield 30 and undercover 37 are connected together by a screw 37A. Specifically, screw 37A is screwed into a mount hole formed on a mount boss 37b formed on an inner side of undercover 37. Leg shield 30 and undercover 37 are also connected together in other locations.

(Function·Effect)

Leg shield 30 is formed with recess 32A, which surrounds air cleaner 60. Recess 32A includes round portion 32r along direction D1 in which intake port 61a is opened. Therefore, outside air around leg shield 30 is guided to intake port 61a by recess 32A. That is, since recess 32A includes round portion 32r along direction D1 in which intake port 61a is opened, air resistance provided by leg shield 30 is decreased when outside air around leg shield 30 is sucked into intake port 61a.

That is, outside air is adequately and smoothly sucked into air cleaner 60. Also, since intake port 61a is opened rearwardly and downwardly, foreign matter such as dust and water flung up by front wheel 20 is not drawn into air cleaner 60.

According to the embodiment, body cowl 36 can be mounted to and dismounted from leg shield 30, to which undercover 37 is connected. Therefore, maintenance work for components (for example, air cleaner 60) arranged between body cowl 36 and undercover 37 is made easy.

According to the embodiment, engagement convex portion 39a and receiving portion 33a absorb dimensional tolerances of leg shield 30 and side cover 39. Therefore, motorcycle 10 is improved in outward appearance without the need for any complex construction to absorb dimensional tolerances.

Also, front end 39fe of side cover 39 abuts against enlarged width portion 33s, which spreads outward in the vehicle width direction. Therefore, even when front end 39fe abuts against enlarged width portion 33s, shifts due to dimensional tolerances are made inconspicuous.

Other Embodiments

The contents of the invention have been disclosed by way of an embodiment of the invention. However, it should be understood that the description and drawings that constitute the disclosure do not limit the invention. Various alternative embodiments will be apparent to those skilled in the art from the disclosure.

For example, as described above, enlarged width portion 33s is provided on leg shield 30, but enlarged width portion 33s may instead not be provided. Also, body cowl 36 is described as being mounted to and dismounted from leg shield 30, but this is not necessarily essential.

Intake port 61a is described as opened downwardly and rearwardly, but intake port 61a may just be opened rearwardly, or upward and rearwardly.

In this manner, the invention of course includes various embodiments not described herein. Accordingly, the technical scope of the invention should be determined only by those specified matters of the invention pertinent to claims, which are appropriate from the above descriptions.

The invention claimed is:

1. A straddle-type vehicle comprising:
a front wheel;
a leg shield arranged rearwardly of the front wheel; and
an air cleaner arranged between the front wheel and the leg shield and formed with an intake port through which outside air is sucked, wherein
the intake port is opened rearwardly of the straddle-type vehicle,
the leg shield is formed with a recess that surrounds the air cleaner,
the recess includes an inclined portion along a direction in which the intake port is opened as viewed in a side view of the straddle-type vehicle,
the air cleaner includes an intake duct extending between a body of the air cleaner and the intake port, and
the intake duct is arranged above the body of the air cleaner.

2. The straddle-type according to claim 1, wherein the intake port opens downwardly and toward a rear of the straddle-type vehicle.

3. The straddle-type according to claim 1, wherein the recess includes a rear wall portion that is contiguous to a lower end of the inclined portion.

4. The straddle-type according to claim 1, wherein at least a part of the air cleaner is arranged forwardly of the inclined portion.

5. The straddle-type according to claim 1, further comprising:
a steering head pipe arranged above the front wheel;
a body cowl arranged forwardly of the steering head pipe and extending downwardly of the steering head pipe; and
an undercover connected to a lower end of the leg shield, wherein
the leg shield is arranged rearwardly of the body cowl, and
the body cowl is mounted to and dismounted from the leg shield, to which the undercover is connected.

6. The straddle-type according to claim 1, further comprising:
   a rear cover provided rearwardly of the leg shield to cover a predetermined region of the straddle-type vehicle, wherein
   an engagement convex portion formed at a front end of the rear cover engages with the leg shield, and
   a receiving portion formed on the leg shield receives the engagement convex portion.

7. The straddle-type according to claim 5, wherein
   the leg shield includes an enlarged width portion spreading outward from inward in a vehicle width direction, and
   a front end of the rear cover abuts against the enlarged width portion.

* * * * *